Aug. 10, 1926.
E. STRONG
MAGNETO ADJUSTER
Filed Sept. 15, 1924
1,595,631
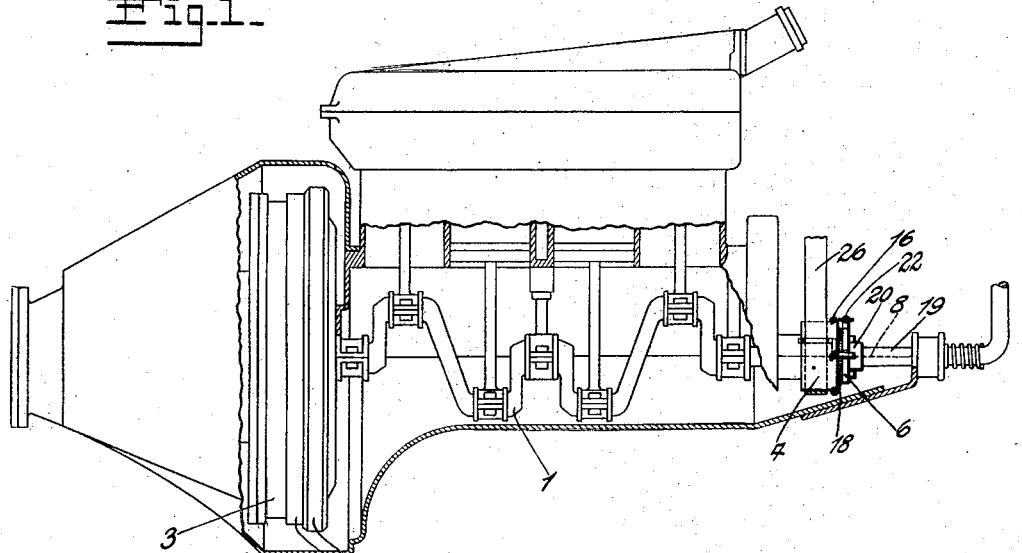
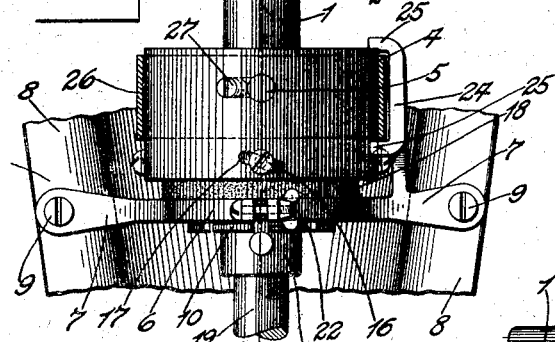
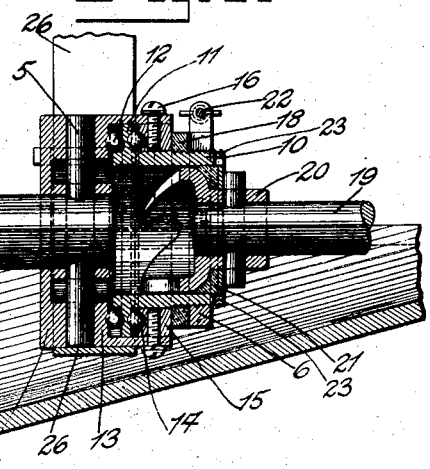
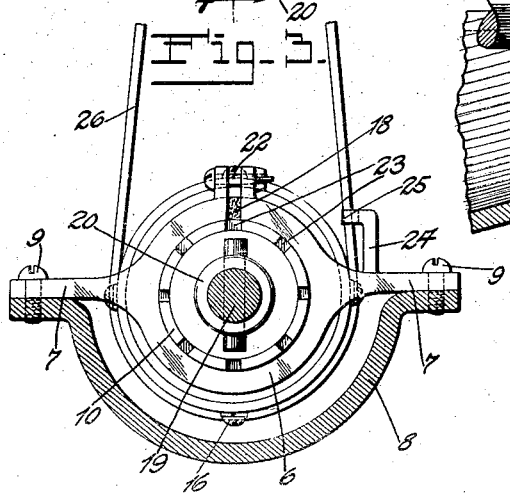
Inventor:
Elmer Strong,
His Attorneys Patented Aug. 10, 1926.

1,595,631

UNITED STATES PATENT OFFICE.

ELMER STRONG, OF MANSFIELD, MISSOURI.

MAGNETO ADJUSTER.

Application filed September 15, 1924. Serial No. 737,900.

This invention relates to magneto adjusters.

An object of the invention is to provide an improved device for adjusting parts of the magneto included in the ignition system of internal combustion engines.

A special object of the invention is to provide a device for adjusting and retaining in proper adjustment the parts of the magneto operatively connected with the crank shaft of a Ford automobile so that said parts will operate properly and with unfailing accuracy.

Other objects will appear from the following description, reference being made to the drawing in which Fig. 1 is a view showing my invention applied to the crank shaft of a Ford automobile.

Fig. 2 is a plan view of the device.

Fig. 3 is a front end elevation.

Fig. 4 is a sectional view on the line 4—4 of Fig. 2.

My present invention is shown in Fig. 1 in connection with the crank shaft 1 of a Ford engine in which the usual movable and stationary parts of the magneto 2 are controlled by the fly wheel 3. It sometimes occurs that adjustment is needed to obtain best results. My present invention is connected with the crank shaft and is operative to adjust the crank shaft and thereby the magneto and retain them in proper adjustment. The fan belt pulley 4 is attached to the crank shaft 1 by means of the usual starting pin 5.

My invention cooperates with the pulley 4 to hold the crank shaft in proper adjustment and prevent longitudinal vibration thereof. A yoke comprising a split ring 6 having laterally extended arms 7 is attached to the forward extension 8 of the crank case by screws 9. A sleeve 10 is screwed into the ring 6 and extends rearwardly into the fan belt pulley 4. Said sleeve 10 is formed with a circumferential flange 11 forming a part of double internal thrust bearings. The balls 12 of one of the thrust bearings are between the flange 11 and the internal shoulder 13 of the pulley 4. The balls 14 of the other thrust bearing are between the flange 11 and the ring 15 attached within the outer end of the pulley 4 by screws 16 passing through inclined slots 17 in the pulley and engaging said ring. Thus, by turning the ring 15 in one direction or the other, the degree of pressure upon the thrust bearings can be varied as required. A packing 18 felt or other appropriate material is placed between the rings 6 and 15 to prevent leakage of the lubricant with which the pulley 4 is partly filled.

The starting crank 19 is supported with the ratchet 20 thereof within the sleeve 10. Packing 21 is placed against the outer end of the ratchet 20 so as to retain the lubricant within the sleeve 10 and the pulley 4. The ring 6 may be tightened upon the sleeve 10 by tightening the bolt 22 after the parts have been adjusted properly. The outer end of the sleeve 16 has a number of notches 23 therein designed and adapted to be engaged by a tool when it is desired to adjust the parts. It is obvious that by turning the sleeve 10 the crank shaft 1 will be moved to proper position to obtain the desired adjustment of the magneto parts. After such adjustment is obtained the bolt 22 should be tightened to prevent the parts from working out of position.

As shown in Figs. 2 and 3 one side of the ring 6 is provided with an arm 24 having flanges 25 serving to retain the fan belt 26 upon the pulley 4. A lubricant opening 27 through the pulley 4 affords means for filling the pulley with lubricant.

From the foregoing it is apparent that my invention obtains all of its intended objects and purposes in a highly efficient and satisfactory manner and can be easily applied as an attachment to the usual Ford automobile. By use of this invention the magneto parts are prevented from breaking, so that the current supply will continue as long as the engine runs and a practically unfailing source of electricity for combustion purposes is assured.

What I claim and desire to secure by Letters Patent is:—

1. The combination with the crank shaft of an internal combustion engine, a crank case, and a fan belt pulley attached to the crank shaft, of a ring rigidly connected with said crank case, a sleeve having threaded adjustable connection with said ring, and a pair of opposing thrust bearings between said sleeve and said pulley holding the crank shaft from longitudinal oscillation in both directions.

2. The combination with the crank shaft of an internal combustion engine, a crank case, and a fan belt pulley attached to the crank shaft, of a ring rigidly connected with said crank case, a sleeve having adjustable threaded connection with said ring, a pair of thrust bearings between said ring and said pulley holding the crank shaft from longitudinal oscillation in both directions, and means for adjusting one part of one of said bearings with respect to said sleeve and holding said part in such adjustment.

3. The combination with the crank shaft of an internal combustion engine, a crank case, and a pulley attached to said shaft, of a ring in one end of said pulley, a sleeve extending through said ring into said pulley, a thrust bearing between said sleeve and said ring, a thrust bearing between said sleeve and said pulley, and a part connected with said crank case and to which said sleeve is connected.

4. The combination with the crank shaft of an internal combustion engine, a crank case, a hollow pulley attached to said shaft, and starting devices enclosed in part within said pulley, of a yoke, means rigidly connecting said yoke with said crank case, a sleeve supported by and attached to said yoke and enclosing a part of said starting devices, and thrust bearings between said sleeve and said pulley holding said pulley from longitudinal vibration.

ELMER STRONG.